United States Patent
Pogadaev et al.

(10) Patent No.: US 6,242,867 B1
(45) Date of Patent: Jun. 5, 2001

(54) CIRCUIT FOR SYNCHRONIZING THE IGNITION OF ELECTRONIC BALLAST DISCHARGE LAMPS

(75) Inventors: Vladimir Pogadaev; Boris Blyashov, both of Jerusalem (IL)

(73) Assignee: JBP Technologies Ltd., Jerusalem (IL)

( * ) Notice: Subject to any disclaimer, the term of this patent is extended or adjusted under 35 U.S.C. 154(b) by 0 days.

(21) Appl. No.: 09/508,857

(22) PCT Filed: Sep. 16, 1998

(86) PCT No.: PCT/IL98/00448

§ 371 Date: Jun. 23, 2000

§ 102(e) Date: Jun. 23, 2000

(87) PCT Pub. No.: WO99/14992

PCT Pub. Date: Mar. 25, 1999

(30) Foreign Application Priority Data

Sep. 18, 1997 (IL) ........................................ 121801

(51) Int. Cl.[7] .................................................. H05B 37/02
(52) U.S. Cl. .......................... 315/224; 315/219; 315/282; 315/209 R; 315/DIG. 7
(58) Field of Search .................. 315/224, 209 R, 315/276, 282, 290, 274, 275, 219, 291, 307, DIG. 7, 225

(56) References Cited

U.S. PATENT DOCUMENTS

| | | | |
|---|---|---|---|
| 4,291,254 | * 9/1981 | Arlt et al. ............................ | 315/240 |
| 4,484,108 | * 11/1984 | Stupp et al. .......................... | 315/219 |
| 5,233,273 | * 8/1993 | Waki et al. ........................... | 315/224 |
| 5,384,518 | * 1/1995 | Kido et al. ........................... | 315/225 |
| 5,739,644 | * 4/1998 | Bernitz et al. ....................... | 315/289 |
| 5,945,786 | * 8/1999 | Jurek .................................... | 315/276 |

* cited by examiner

*Primary Examiner*—Haissa Philogene
(74) *Attorney, Agent, or Firm*—Scully, Scott, Murphy & Presser

(57) ABSTRACT

A circuit for synchronizing the ignition in electronic ballast discharge lamps, wherein a half-bridge output stage of the electronic ballast has an upper switch and a lower switch. The lower switch is connected to a common wire of a power supply, and a high voltage impulse for igniting the lamp is generated only when the lower switch is open. The circuit includes a transformer including a first winding and a second winding magnetically coupled to each other, with the second winding having a lower number of turns than the first winding. One lead of the first winding is connectable to an electrode of a discharge lamp, and a second lead thereof is connectable to the common wire of the power supply. A diode is connected with its anode to one lead of the second winding, and with its cathode to the junction between the upper and lower switches. A second lead of the second winding is connected to a thyristor, which is connected to a first plate of a discharge capacitor, and a second plate of the capacitor is connected to the common wire, whereby a discharge current of the capacitor flows through the second winding only when the lower switch is open.

8 Claims, 4 Drawing Sheets

CIRCUIT FOR SYNCHRONIZING THE IGNITION OF ELECTRONIC BALLAST DISCHARGE LAMPS

TECHNICAL FIELD

The present invention relates to the art of igniting discharge lamps, and more particularly, to a circuit for synchronizing the ignition of electronic ballast discharge lamps.

The invention is especially useful for igniting high intensity discharge (HID) lamps, e.g., high pressure sodium (HPS) lamps, while protecting the ballast circuits against damage when the lamp does not ignite and repeated attempts to do so are performed.

BACKGROUND ART

A great number of electronic ballast circuits for igniting HID lamps are known and utilized. All known half-bridge ballasts suffer from the drawback of their failure to protect the ballast against damage during the starting or striking period of the lamp when the lamp is out of order and will not ignite.

For the sake of completeness and better understanding, a typical prior art HPS ballast circuit such as those referred to above, is shown in FIG. 1. The circuit is illustrated and described in detail in an article by Peter N. Wood, entitled "Electronic Ballasts Using the Cost-Saving IR2155 Driver," *MOS-Gate Driver Data Book*, E50161, International Rectifier Application Notes (1995).

DISCLOSURE OF THE INVENTION

It is therefore a broad object of the present invention to provide an electronic ballast circuit for HID lamps which is capable of protecting the ballast against damage during attempts to ignite it, when the lamp is not susceptible to striking.

Therefore, in accordance with the present invention, there is provided a circuit for synchronizing the ignition in electronic ballast discharge lamps, including a half-bridge output stage of the electronic ballast having a upper switch and a lower switch, said lower switch being connected to a common wire of a power supply, in which circuit a high voltage impulse for igniting the lamp is only generated when the lower switch is open, said circuit comprising a transformer including a first winding and a second winding magnetically coupled to each other, said second winding having a lower number of turns than said first winding; one lead of said first winding being connectable to an electrode of a discharge lamp and a second lead thereof being connectable to the common wire of said power supply; a diode connected with its anode to one lead of said second winding and with its cathode to the junction between said upper and lower switches; a second lead of said second winding connected to a symmetrical diode thyristor, said thyristor being connected to the first plate of a discharge capacitor and the second plate of said capacitor being connected to said common wire; whereby discharge current of said capacitor flows through said second winding only when said lower switch is open.

The invention further provides a circuit for synchronizing the ignition in electronic ballast discharge lamps, including a half-bridge output stage of the electronic ballast having a upper switch and a lower switch, said lower switch being connected to a common wire of a power supply, in which circuit a high voltage impulse for igniting the lamp is only generated when the lower switch is open, said circuit comprising a transformer including a first winding and a second winding magnetically coupled to each other, said second winding having a lower number of turns than said first winding; one lead of said first winding being connectable to an electrode of a discharge lamp and a second lead thereof being connected to the junction between said upper and lower switches through a separating capacitor; a diode connected with its anode to one lead of said second winding through a thyristor, and with its cathode to the junction between said first and second power switches; a second lead of said second winding being connected to said common wire through a discharge capacitor; whereby discharge current of said capacitor flows through said second winding only when said lower switch is open.

The invention still further provides a circuit for synchronizing the ignition in electronic ballast discharge lamps, including a half-bridge output stage of the electronic ballast having a upper switch and a lower switch, said lower switch being connected to a common wire of a power supply, in which circuit a high voltage impulse for igniting the lamp is only generated when the lower switch is open, said circuit comprising a transformer including a first winding and a second winding magnetically coupled to each other, said second winding having a lower number of turns than said first winding; one lead of said first winding being connectable to an electrode of a discharge lamp and a second lead thereof being connectable to the common wire of said power supply; a diode connected with its anode to one lead of said second winding through a thyristor, and with its cathode to the junction between said first and second power switches; a second lead of said second winding being connected to said common wire through a discharge capacitor; whereby discharge current of said capacitor flows through said second winding only when said lower switch is open.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a circuit diagram of a prior art electronic ballast circuit for an HPS lamp;

FIG. 2 is a diagram of a first embodiment of a synchronization circuit for striking an HID lamp according to the present invention;

FIG. 3 is a circuit diagram of the present invention as shown in FIG. 2, integrated into the prior art circuit of FIG. 1;

FIG. 4 is a further embodiment of the synchronization circuit according to the present invention; and FIG. 5 is a modification of the circuit of FIG. 4.

DETAILED DESCRIPTION

Figure 1:
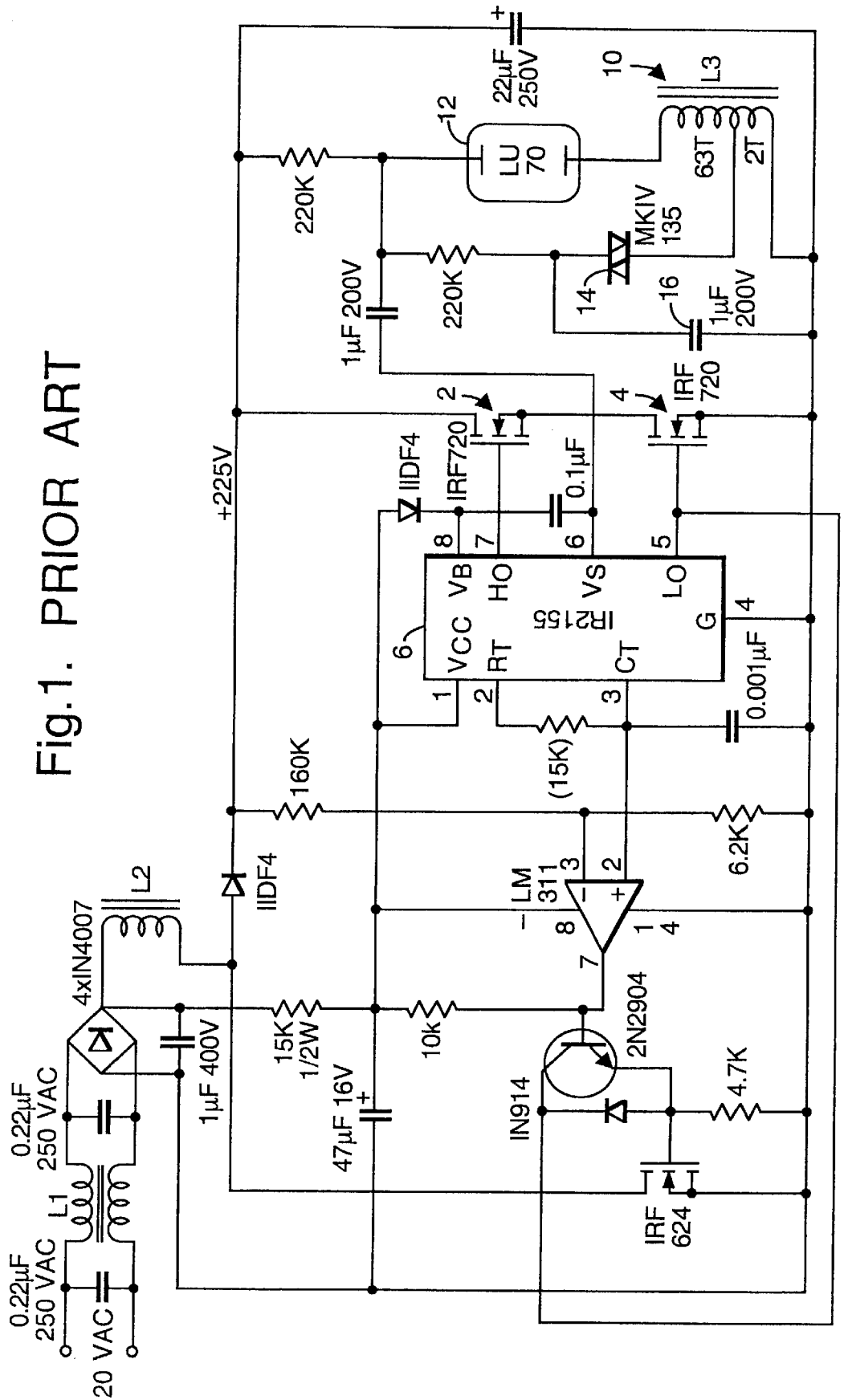

The circuit of the prior art electronic ballast shown in FIG. 1 has two power switches 2, 4 in a totem pole (half-bridge)

configuration. These switches 2 and 4 are power MOSFETs alternatively switched to their conductive state by a MOS gate driver 6 (MGD IR 2155). The MGD 6 provides a high-frequency square-wave signal with a frequency from 20 to 80 kHz. As described in the above-mentioned article, the circuit provides an input power factor of at least 0.9 and has DC bus control limiting the voltage to 225 VDC, whether or not the lamp is energized. The transformer 10 performs two functions: (1) it limits the current for the negative resistance characteristics of the lamp, and (2) it produces a pulse voltage step-up function to strike the HPS lamp 12. The 3 kV pulse voltage is derived from a 135 V symmetrical diode thyristor 14, e.g., a SIDAC or a DIAC, which discharges a 1 $\mu$f capacitor 16 into the 2-turn winding of transformer 10. The 30:1 step ratio of transformer 10 supplies the starting pulse to lamp 12. After the lamp strikes, there is insufficient charge voltage on the 1 $\mu$f capacitor 16 in the 2-turn winding circuit to avalanche the thyristor 14, and no further start pulses are supplied. The hot re-strike time of this ballast is approximately 75 seconds.

Therefore, an attempt to re-strike a lamp with the ballast circuit of FIG. 1, prior to expiration of the 75-second re-strike time when the lamp is not insusceptible to striking and the switch 4 is closed, will result in the breakdown of the switch 4 and failure of the device as a whole. This is due to the fact that the resistance of the closed switch 4 substantially exceeds the resistance of hot lamp 12. When a high-voltage striking pulse is supplied, the voltage drop across the switch 4 substantially exceeds its operational voltage and results in its breakdown.

In the shown circuit, the supply of the high-voltage striking pulse is not coordinated at all with the generation of the high-frequency square wave signal, i.e., striking of the lamp 12 is not synchronized with the operation of the output electronic stage of the ballast; therefore, striking the lamp in the period when switch 4 is closed, will result in ballast failure.

Since an attempt to strike the arc lamp with the switch 4 closed is probable when re-striking the lamp within a hot re-striking time period, e.g., within 75 seconds, the prior art ballast circuit of FIG. 1 can hardly be considered as providing striking of a lamp at the necessary, reliable level.

Figure 2:
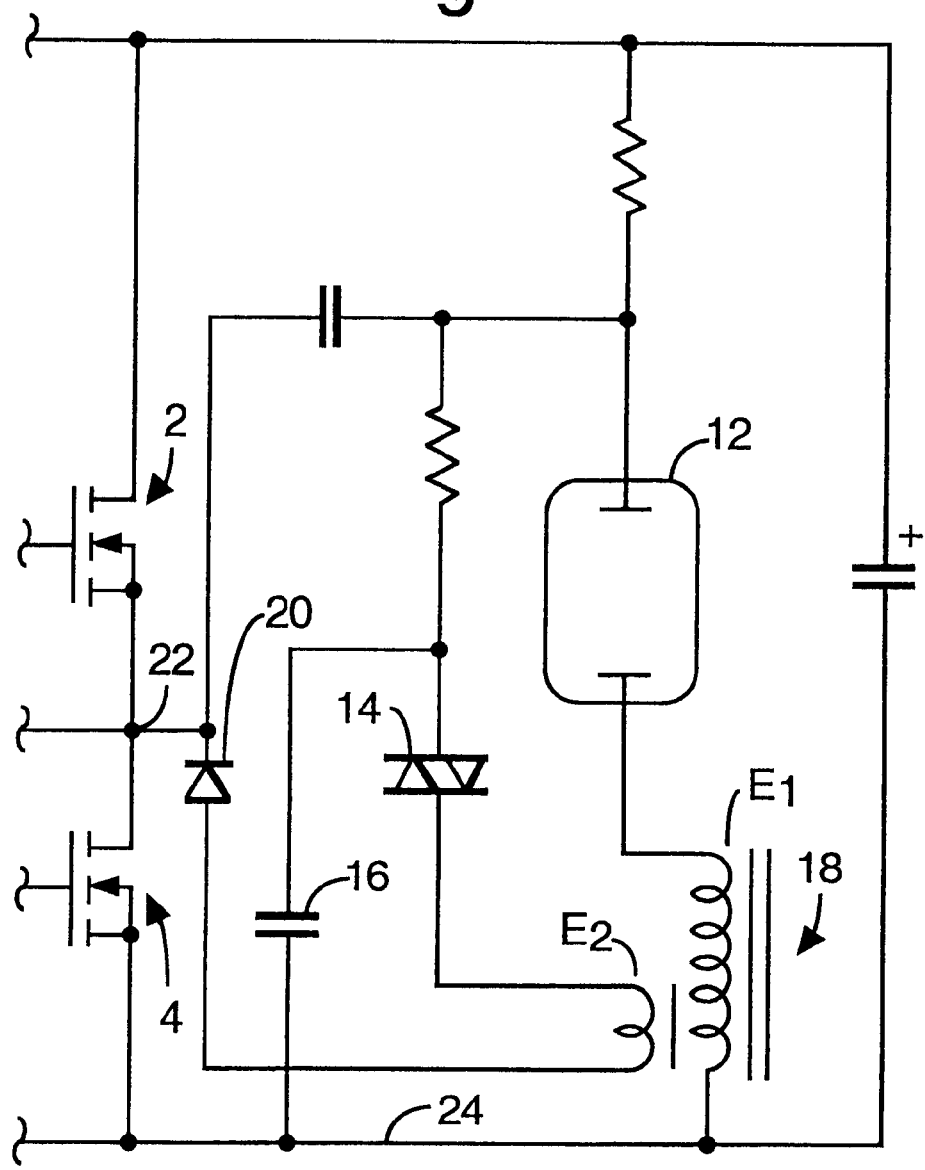

In order to overcome the above drawback, the invention provides a circuit for synchronizing the lamp's striking instance with the operation of the output stage of the electronic ballast circuit. Such a synchronization circuit is shown in FIG. 2., and consists of transformer 18 with two galvanically uncoupled windings $E_1$ and $E_2$, having different numbers of turns. The winding $E_2$ of transformer 18 has a lesser number of turns, and is connected to the anode of diode 20. The cathode of said diode 20 is connected to junction 22 of the half-bridge output stage of the ballast between the upper and lower switches 2, 4 respectively. The lower switch 4 is connected to the common wire 24. One plate of capacitor 16 is connected to the common wire 24, and the second plate of capacitor 16 is connected to thyristor 14 The other end of thyristor 14 is connected to the second end of winding $E_2$ of transformer 18. The winding $E_1$ of transformer 18 is connected in series to one electrode of the discharge lamp 12.

Figure 3:
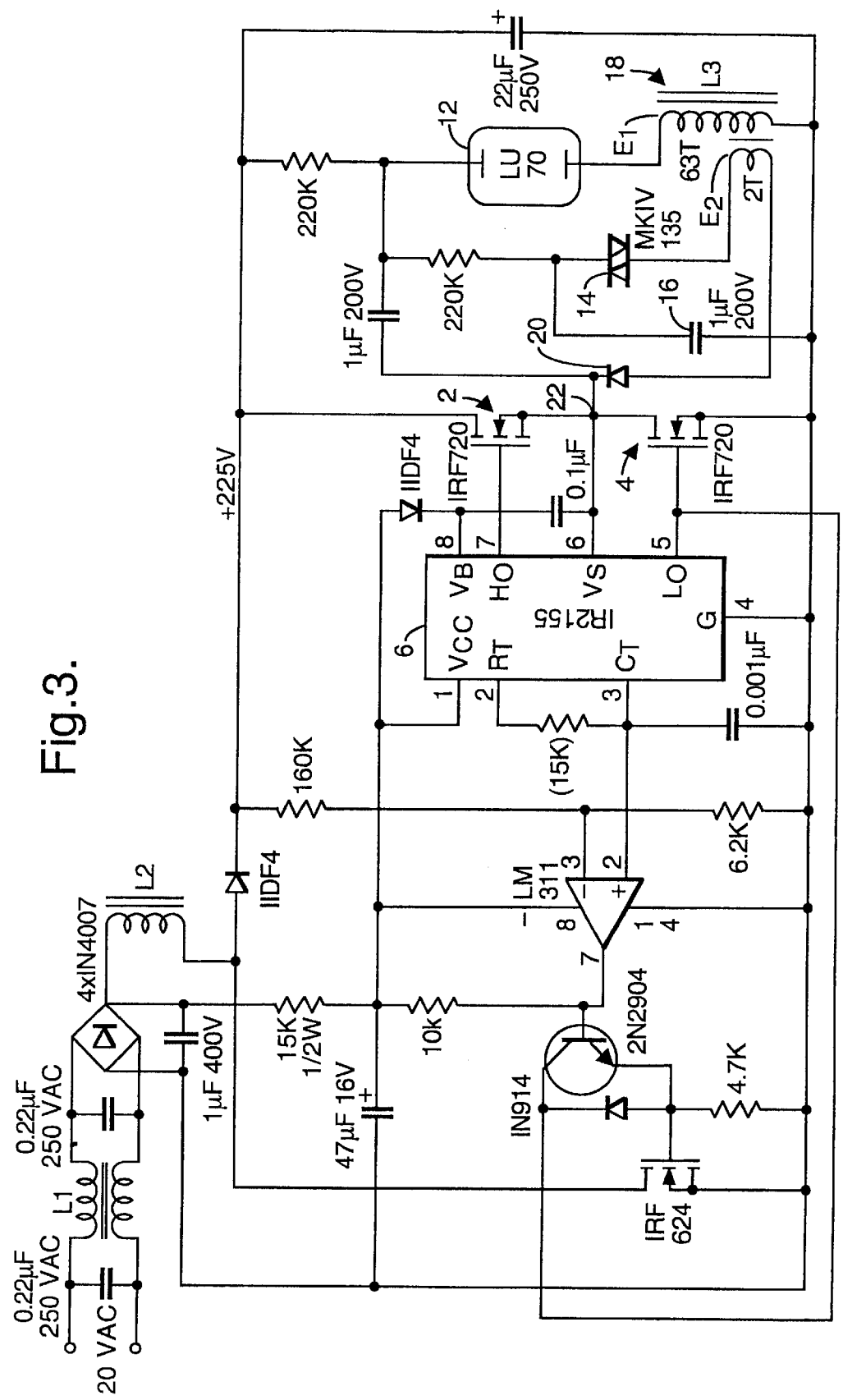

In FIG. 3, there is shown the circuit of FIG. 1, modified to incorporate the synchronizing circuit of FIG. 2.

As is clearly seen in FIG. 3, the synchronizing circuit assures that the discharge current of capacitor 16 flows through winding $E_2$ of transformer 18 only when lower switch 4 of the electronic ballast output stage is open.

Figure 4:
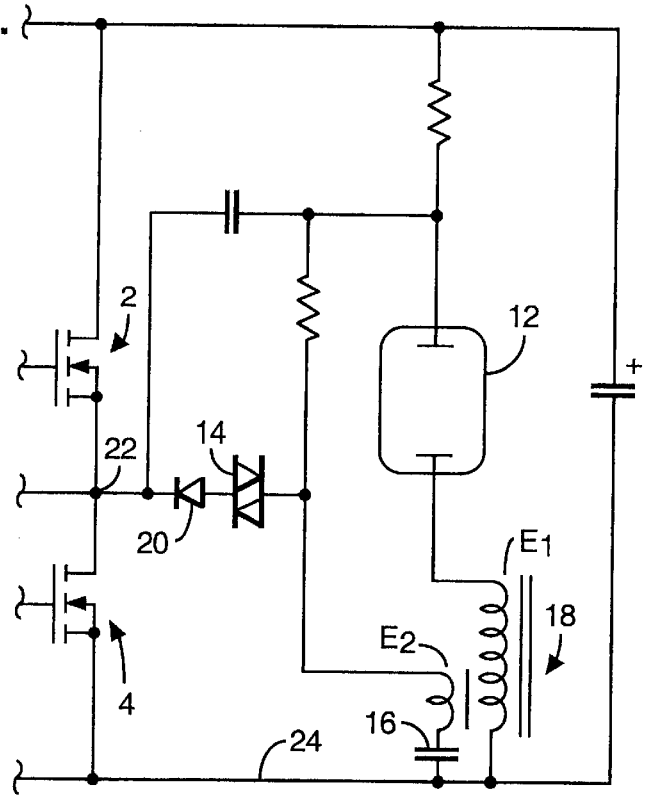

The same results may be achieved by connecting the various elements in a different sequence, as shown in FIG. 4. One end of winding $E_2$ of transformer 18 is connected to thyristor 14, which in turn is connected to diode 20, leading to junction 22 between switches 2 and 4 of the output stage. The other end of the winding $E_2$ is connected to the common wire 24 through the discharge capacitor 16.

Figure 5:
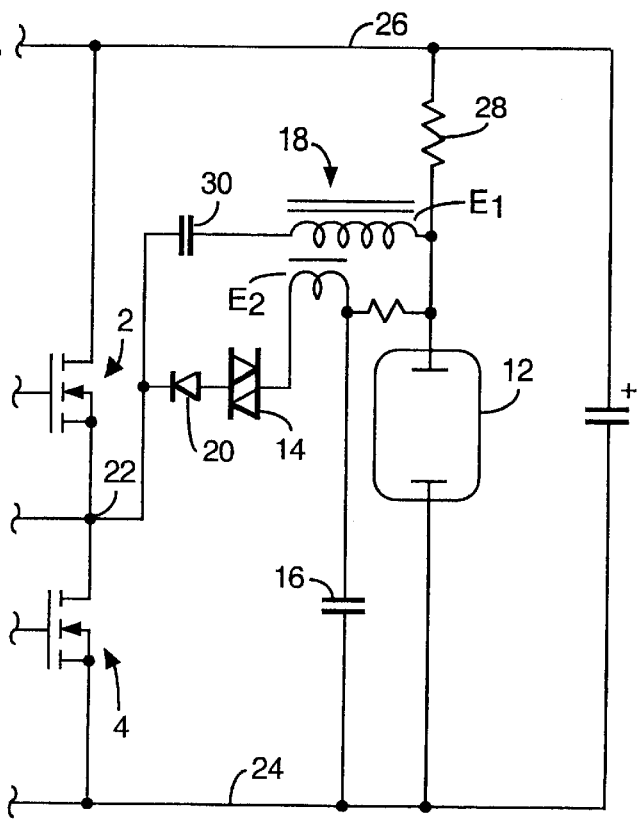

FIG. 5 illustrates another possible embodiment of the present invention in which one lead of the winding El is connected to the power supply wire 26 via resistor 28 and the second lead is effectively connected to the common wire 24 through a separating capacitor 30 and the lower switch 4.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A circuit for synchronizing the ignition of an electronic ballast discharge lamp, including a half-bridge output stage of the electronic ballast having a upper switch and a lower switch, said lower switch being connected to a common wire of a power supply, in which circuit a high voltage impulse for igniting the lamp is only generated when the lower switch is open, said circuit comprising:

a transformer including a first winding and a second winding magnetically coupled to each other, said second winding having a lower number of turns than said first winding;

one lead of said first winding being connectable to an electrode of the discharge lamp and a second lead thereof being connectable to the common wire of said power supply;

a diode connected with its anode to one lead of said second winding and with its cathode to the junction between said upper and lower switches;

a second lead of said second winding connected to a thyristor, said thyristor being connected to the first plate of a discharge capacitor and the second plate of said capacitor being connected to said common wire;

whereby discharge current of said capacitor flows through said second winding only when said lower switch is open.

2. A circuit for synchronizing the ignition of an electronic ballast discharge lamp, including a half-bridge output stage of the electronic ballast having a upper switch and a lower switch, said lower switch being connected to a common wire of a power supply, in which circuit a high voltage impulse for igniting the lamp is only generated when the lower switch is open, said circuit comprising:

a transformer including a first winding and a second winding magnetically coupled to each other, said second winding having a lower number of turns than said first winding;

one lead of said first winding being connectable to an electrode of the discharge lamp and a second lead thereof being connected to the junction between said upper and lower switches through a separating capacitor;

a diode connected with its anode to one lead of said second winding through a thyristor, and with its cathode to the junction between said upper and lower power switches;

a second lead of said second winding being connected to said common wire through a discharge capacitor;

whereby discharge current of said capacitor flows through said second winding only when said lower switch is open.

3. A circuit for synchronizing the ignition of an electronic ballast discharge lamp, including a half-bridge output stage of the electronic ballast having a upper switch and a lower switch, said lower switch being connected to a common wire of a power supply, in which circuit a high voltage impulse for igniting the lamp is only generated when the lower switch is open, said circuit comprising:

a transformer including a first winding and a second winding magnetically coupled to each other, said second winding having a lower number of turns than said first winding;

one lead of said first winding being connectable to an electrode of the discharge lamp and a second lead thereof being connectable to the common wire of said power supply;

a diode connected with its anode to one lead of said second winding through a thyristor, and with its cathode to the junction between said first and second power switches;

a second lead of said second winding being connected to said common wire through a discharge capacitor;

whereby discharge current of said capacitor flows through said second winding only when said lower switch is open.

4. The circuit as claimed in any one of the preceding claims, wherein said thyristor is a symmetrical diode thyristor.

5. The circuit as claimed in claim 4, wherein said symmetrical diode thyristor is a SIDAC or a DIAC.

6. The circuit as claimed in any one of claims 1, 2 or 3, wherein said upper and lower switches are MOSFETs.

7. The circuit as claimed in claim 4, wherein said upper and lower switches are MOSFETs.

8. The circuit as claimed in claim 5, wherein said upper and lower switches are MOSFETs.

* * * * *